US011199952B2

(12) United States Patent
Deselaers et al.

(10) Patent No.: US 11,199,952 B2
(45) Date of Patent: *Dec. 14, 2021

(54) ADJUSTING USER INTERFACE FOR TOUCHSCREEN AND MOUSE/KEYBOARD ENVIRONMENTS

(71) Applicant: Google LLC, Mountain View, CA (US)

(72) Inventors: Thomas Deselaers, Zurich (CH); Victor Carbune, Wintherthur (CH); Daniel Martin Keysers, Stallikon (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,604

(22) Filed: May 7, 2021

(65) Prior Publication Data

US 2021/0263626 A1      Aug. 26, 2021

Related U.S. Application Data

(63) Continuation of application No. 16/040,394, filed on Jul. 19, 2018, now Pat. No. 11,042,272.

(51) Int. Cl.
*G06F 3/0482*   (2013.01)
*G06F 3/0484*   (2013.01)
*G06F 3/0487*   (2013.01)

(52) U.S. Cl.
CPC .......... *G06F 3/0484* (2013.01); *G06F 3/0482* (2013.01); *G06F 3/0487* (2013.01)

(58) Field of Classification Search
CPC ................................................ G06F 3/048–05
See application file for complete search history.

(56) References Cited

U.S. PATENT DOCUMENTS

| 7,047,197 | B1 | 5/2006 | Bennett |
| 9,152,529 | B2* | 10/2015 | George ............... G06F 11/3438 |
| 10,346,488 | B1* | 7/2019 | Khoury ............. G06F 16/24578 |
| 2004/0267806 | A1 | 12/2004 | Lester |
| 2007/0300185 | A1 | 12/2007 | Macbeth et al. |
| 2009/0164936 | A1* | 6/2009 | Kawaguchi ........... G06F 3/0488 715/788 |
| 2009/0303676 | A1 | 12/2009 | Behar et al. |
| 2010/0302212 | A1* | 12/2010 | Weber .................. G06F 3/0488 345/178 |
| 2011/0057886 | A1* | 3/2011 | Ng ...................... G06F 3/04886 345/173 |
| 2013/0027318 | A1* | 1/2013 | Lection ............... G06F 3/04842 345/173 |

(Continued)

OTHER PUBLICATIONS

International Preliminary Report on Patentability from International Application No. PCT/US2019/025888, dated Jan. 28, 2021, 8 pp.

(Continued)

*Primary Examiner* — Daniel Rodriguez
(74) *Attorney, Agent, or Firm* — Shumaker & Sieffert, P.A.

(57) ABSTRACT

Aspects of the subject technology relate to dynamically adjusting a UI based on the current modality. Layout features of a UI may be determined based on an input modality of a computing device. The arrangement of the UI elements may be determined based on the layout features and respective importance scores of the UI elements. The UI elements arranged based on the arrangement may be provided for display of the computing device.

20 Claims, 8 Drawing Sheets

(56) References Cited

U.S. PATENT DOCUMENTS

| | | | |
|---|---|---|---|
| 2015/0153897 A1* | 6/2015 | Huang | G06F 3/0418 |
| | | | 345/173 |
| 2015/0213244 A1* | 7/2015 | Lymberopoulos | ............................ |
| | | | H04L 63/0861 |
| | | | 726/18 |
| 2015/0293695 A1* | 10/2015 | Schonleben | G06F 3/0412 |
| | | | 345/173 |
| 2015/0378575 A1 | 12/2015 | Kaplinger et al. | |
| 2016/0275277 A1* | 9/2016 | Huang | G06F 21/60 |
| 2016/0314289 A1* | 10/2016 | Parikh | G06F 21/316 |
| 2017/0031588 A1* | 2/2017 | Berger | G06F 3/0202 |
| 2017/0102781 A1* | 4/2017 | Jiang | G06F 3/0235 |
| 2017/0169340 A1 | 6/2017 | Asente et al. | |
| 2017/0185251 A1* | 6/2017 | Jain | G06F 3/0481 |
| 2018/0121034 A1 | 5/2018 | Baker et al. | |
| 2018/0129413 A1* | 5/2018 | Berger | G06F 3/021 |
| 2019/0179513 A1* | 6/2019 | Gritzman | G06F 3/04817 |
| 2020/0026400 A1 | 1/2020 | Deselaers et al. | |

OTHER PUBLICATIONS

International Search Report and Written Opinion from PCT/US2019/025888, dated Jul. 12, 2019, 12 pgs.

Prosecution History from U.S. Appl. No. 16/040,394 dated Jan. 10, 2020 through Jan. 13, 2021, 55 pgs.

Response to Communication pursuant to Rules 161(1) and 162 EPC from European Patent Application No. 19718549.9, dated Jan. 28, 2021, filed Aug. 9, 2021, 13 pp.

* cited by examiner

ADJUSTING USER INTERFACE FOR TOUCHSCREEN AND MOUSE/KEYBOARD ENVIRONMENTS

This application is a Continuation of U.S. patent application Ser. No. 16/040,394, filed Jul. 19, 2018, the entire contents of which are hereby incorporated by reference.

SUMMARY

Aspects of the subject technology relate to generation and management of user interface (UI). Layout features of a UI may be determined based on an input modality of a computing device. The arrangement of the UI elements may be determined based on the layout features and respective importance scores of the UI elements. The UI elements arranged based on the arrangement may be provided for display of the computing device.

Aspects of the subject, technology also relate to a computing system. The system may include one or more processors and a non-transitory computer-readable medium comprising instructions stored therein, which, when processed by the one or more processors, cause the one or more processors to perform operations. The operations include determining layout features of a user interface (UI) based on an input modality of a computing device. The operations also include determining respective click target sizes of UI elements based on the layout features and respective importance scores of the UI elements. The operations further include determining an arrangement of the selected UI elements based on the layout features, respective importance score of the UI elements, and the respective click target sizes of the UI elements. The operations further include providing the arranged UI elements for display.

Aspects of the subject technology also relate to a non-transitory computer-readable medium including instructions stored therein, which when executed by a processor, cause the machine to perform operations including determining layout features of a user interface (UI) based on an input modality of a computing device. The operation also may include determining the respective importance scores based on specified by an application. The operations further include selecting a set of UI elements from the UI model based on the layout features and respective importance scores of the UI elements. The operations also include determining an arrangement of the selected UI elements based on the layout features and the respective importance scores of the UI elements. The operations also include providing the UI.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1A:
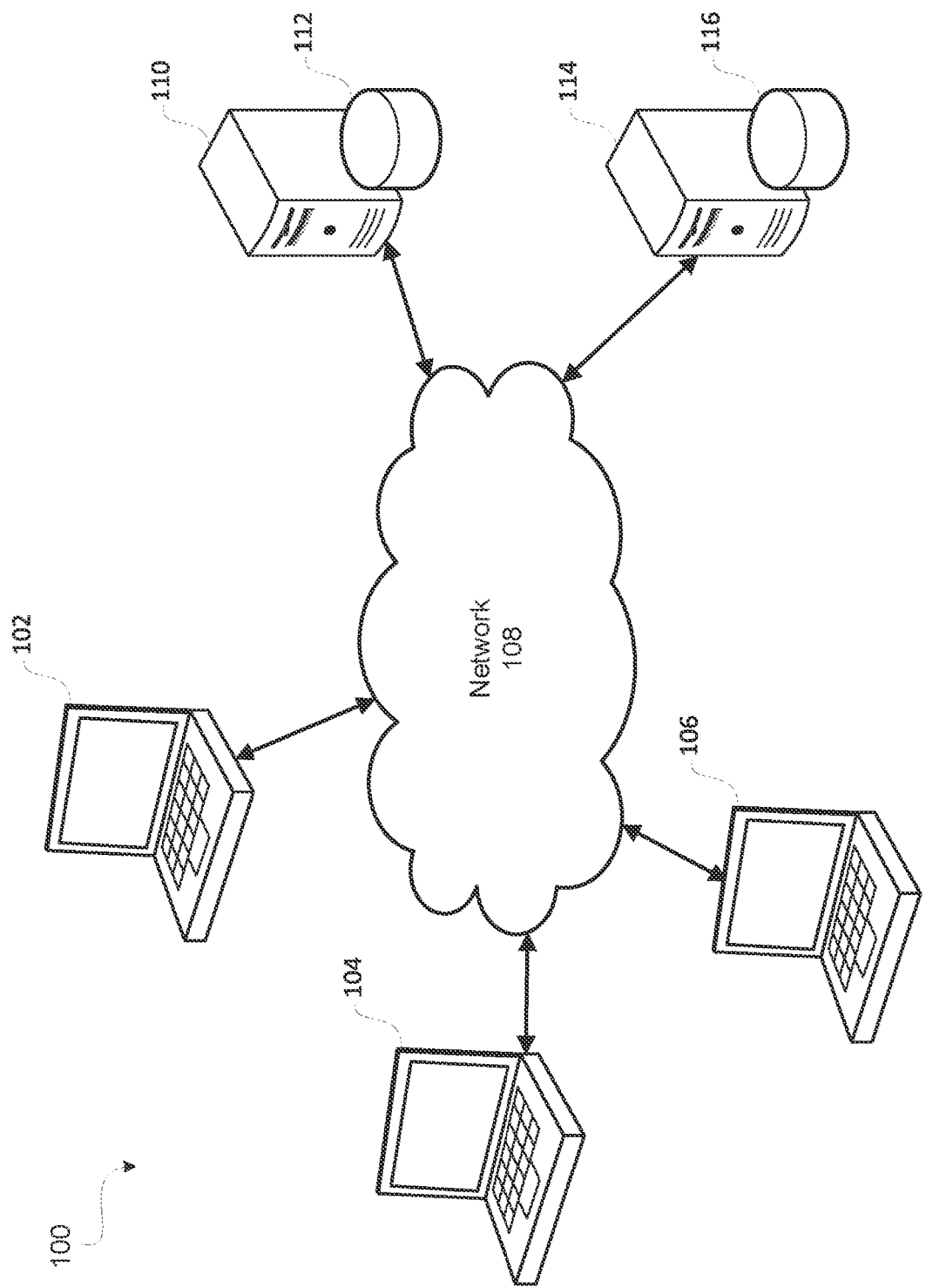
FIG. 1A illustrates an example client-server environment according to example aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

A user interlace (UI) of an application running on a computing device may be provided with a number of user interface (UI) elements (i.e., icons, buttons, menu options, etc.). Application UI designers may specify rules for UIs, such as the number of UI to be included in the UI of the application and the arrangement of the UI elements relative to each other in the UI. However, computing devices may be laptop computers, desktop computers, tablet computers, and mobile devices. The resolutions, dimensions, and sizes of computing device displays may vary based on the operating environments (e.g., laptop, desktop, tablet, mobile device). Providing rules for UIs for respective operating environments would be burdensome for application UI designers and would also present technical problems of consuming a large amount of data storages of the computing devices since more rules need to be stored in the data storages.

Further, a computing device, such as a convertible computing device, may be capable of switching between a laptop mode and a tablet mode. While the resolution, dimension, and screen size of the display of the computing device may not change between the laptop mode and the tablet mode, the input method may differ between the laptop mode and tablet mode. For example, when a computing device is operating in the laptop mode, the operating system of the computing device may receive mouse-based input (e.g., input by mouse and/or keyboard). In the laptop mode, a number of UI elements with relatively small click target sizes may be provided in a user interface (UI). The click target sizes of the UI elements may be relatively small since the touch size of a cursor or a pointer used to select the UI elements that comes in contact with the UI elements is relatively small.

The computing device may also operate in the tablet mode in which the operating system of the computing device may receive touchscreen-based input (e.g., input by finger or stylus). The touch size of the finger or stylus may be larger than that of a cursor or a pointer manipulated by mouse-based input. Therefore, UI elements with larger click target sizes than the UI in the laptop mode may be desired to accommodate selecting UI elements using a finger or stylus.

In order to accommodate different input modalities of a computing device, the designers of the UIs may need to provide different rules for UIs for the respective input modalities of the computing device. However, unlike cursors or pointers in the mouse-based input modality, the sizes of a finger or stylus may vary by user in the touch screen-based input modality. The touch sizes of the finger or stylus may vary by user according to the various sizes of the finger or stylus of users. Therefore, providing UI elements with different click target sizes (e.g., larger click target sizes than the laptop mode) in the UI of the tablet mode may still be small for some users.

Providing UI elements with click target sizes that do not match the touch sizes may create unintended selection of an UI element and may present technical problems of unnecessary data processing that negatively impacts data processing and transmission.

To address the technical problems, the subject technology provides technical solutions of providing a user interface (UI) model associated with an application running on the computing device to optimize a UI for mouse-based input modality or touchscreen-based input modality. UI models provide a library of user interface (UI) elements (e.g., menu options, icons, buttons) and rules for laying UI elements in the UI for the application. In particular, layout features of the UI associated with the current input mode are determined based on the UI model associated with the application UI elements to be included in the UI for display may be selected from the UI model based on the determined layout features and importance measurements of the UI elements. The selected UI elements are arranged within the UI based on the rules provided by the UI model.

FIG. 1A illustrates an example environment 100 for automatically adjusting a UI based on the current modality in accordance with the subject technology. The environment 100 includes computing devices 102, 104, and 106, and servers 110 and 114. In some aspects, the environment 100 can have more or fewer computing devices (e.g., 102-106) and/or servers (e.g., 110 and 114) than those shown in FIG. 1A.

Each of the computing devices 102, 104, and 106 can represent various forms of processing devices that have a processor, a memory, and communications capability. The computing devices 102, 104, and 106 may communicate with each other, with the servers 110 and 114, and/or with other systems and devices not shown in FIG. 1A. By way of non-limiting example, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these processing devices or other processing devices.

Each of the computing devices 102, 104, and 106 may be operated in a laptop mode that may allow mouse-based input (e.g., input by mouse and/or keyboard) or a tablet mode that may allow touchscreen-based input (e.g., input by finger or stylus). The operating system on each of the computing devices 102, 104, and 106 may switch between the laptop mode and the tablet mode based on changes detected in hardware configurations of respective computing devices 102, 104, and 106.

Changes in hardware configurations may include detecting changes in the angle between the screen portion and the keyboard portion of a laptop changes from an angle within a predetermined threshold angle (i.e., 180 degrees) to an angle above the predetermined threshold angle. For example, when the angle between the screen portion and the keyboard section is within the predetermined threshold angle, the computing device may be in the laptop mode. However, when the angle between the screen portion and the keyboard portions is above the predetermined threshold angle, the computing device may be in the tablet mode. In some aspects, changes in hardware configuration may be detected when the screen portion and the keyboard portion of the computing device are detached from each other. When the screen portion and the keyboard portion are detached, the computing device may be in the tablet mode. On the other hand, when the screen portion and the keyboard portion are attached, the computing device is in the laptop mode.

Each of the computing devices 102, 104, and 106 may be associated with a user. The user may be the owner of a computing device (e.g., computing device 102, 104, or 106), or a person logged in to an account on the computing device. In some aspects, a user may be associated with multiple computing devices (e.g., any combination of the computing devices 102, 104, and 106). For example, the computing device 102 may be a user's personal laptop and the computing device 104 may be the user's business laptop.

Each of the computing devices 102, 104, and 106 may have applications installed thereon. When an application is launched, the application may provide a user interface (UI) for display via a display of the computing device. Each of the applications installed on the computing devices may include at least one user interface (UI) model. The UI of the application is generated based on the UI model and the usage data associated with the application.

The usage data may include usage logs of the applications and user interactions with the UI elements of the UI associated with the applications. For example, the usage logs of the application may be usage logs collected and aggregated over a predetermined period (e.g., during a session of the application, a day, a week, etc.). The usage logs may include the time of the day the application was launched on the computing device, the number of hours the application was active, and/or the frequency of use of the application.

User interactions with the UI elements may include patterns of clicks received at the respective UI elements within the UI. Clicks may include selecting mechanism for selecting UI elements in the UI. The selecting mechanism may be clicks (i.e., a single click, double clicks) or input gestures (e.g., a dragging, panning, or sliding) received at a UI element via received via a pointer device (e.g., mice, styluses, fingers, etc.). The pattern of clicks may include a type of pointer device used to click respective UI elements, a touch size of click received at respective UI elements, types of selecting mechanism received at respective UI elements, a number of clicks received on respective UI elements, a number of failed clicks, a number of useless clicks, attention span across the layout and contents of the application.

The type of pointer device used may include a mouse, keyboard, joystick, finger, or stylus used to click a UI element in the UI. A type of pointer device may be a mouse, a keyboard, or joystick in a mouse-based input modality, and a finger or stylus pen in a touchscreen-based input modality.

The touch size of click received may be the area of input that came in contact with the UI element when a click is received at the UI element. A touch size may be the area of a fingertip that contacted the touchscreen when receiving an input on a UI element while the computing device is operating in the touchscreen-base input modality. In some other aspects, the touch size of click may include the strength of click. The strength of click may be a touch strength received via a touchscreen when receiving, from a finger or stylus, an input on a UI element while the computing device is operating in the touchscreen-base input modality.

The type of selecting mechanism may include clicks, drags, pans, and slides A UI element may receive a sliding input gesture. In some other aspects, any combination of the types of selecting mechanism may be received at a UI element. For example, a UI element may be panned before receiving a click.

The number of clicks received on an UI element may include successful clicks received on the UI element. For example, a click may be counted as a successful click when the click is received on the UI element, and the click received on the UI element triggers an action associated with the UI element. Frequencies of usage of the UI element may also be determined based on the number of clicks received on the UI element. In some other aspects, the order of accessing UI elements may be determined. The order of access may indicate that a UI element may be consecutively selected.

The number of failed clicks may be counted when clicks are considered as fail. Failed clicks may be two clicks received in vicinity of an UI element within a predetermined period (e.g., within 2 seconds), where the second click of the two clicks triggers the action associated with the UI element. The number of clicks received in vicinity of an UI element before identified as failed clicks may not be limited to two clicks, and the number of clicks may be two or more clicks. The failed clicks may indicate that the click target size of the UI element is too small for the current input modality.

Clicks are determined as useless clicks when a successful click is followed by an action triggering revert to the previous screen within a predetermined period indicating that the UI element received the click by mistake. The useless clicks may not be counted towards the number of clicks received on the UI element.

The attention span may be determined based on scrolling or zooming of a particular area on the layout and/or contents of the application. In some aspects, the attention span may be determined based on eye tracking data received from eye tracking devices (i.e., eye tracking cameras).

The user interactions with the respective UI elements are recorded, and usage data of the application may be updated according to the recorded user interactions. The UI of the application may be updated based on the updated usage data. The UI of the application may be generated and provided for display. When the usage data is updated based on the user interactions, the UI model of the application may be updated, and the UI of the application may be regenerated based on the updated UI model. In some aspects, the number of UI elements included in the regenerated UI may be reduced when compared to the UI before the regeneration. In some other aspects, the location of the UI elements may differ in the UI before and after the regeneration.

Usage data may be generated and recorded for respective applications. For example, usage data of a user associated with one or more computing devices 102, 104, and 106 may be generated and recorded for an application. In some aspects, usage data may be generated for multiple different users of the application on a computing device (i.e., one of computing devices 102, 104, of 106) or on multiple computing devices (i.e., computing devices 102, 104, and 106). The usage data may be stored in the respective computing devices 102, 104, and 106. In some aspects, the usage data may be transmitted to one or more servers (e.g., servers 110 and 114) via network 108. To the extent that the systems discussed herein collect usage data associated with users, or may make use of the usage data, the users are provided with opportunities to control whether programs or features collect usage data (e.g., a user's preferences), and to control the UI associated with applications based on the collected usage data. The users may also be provided with options to turn on or turn off certain features or functions provided by the systems. In some aspects, the users may elect to disable features and functions (e.g., control the UI associated with applications based on the collected usage data) offered by the systems discussed herein. In addition, users may stipulate that certain data be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user has control over whether and how user information is collected, stored and used by the disclosed systems.

The network 108 can be a computer network such as, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102, 104, and 106) and server (e.g., server 110) can occur via a virtual private network (VPN), Secure Shell (SSH) tunnel, Secure Socket Layer (SSL) communication, or other secure network connection. In some aspects, network 108 may further include a corporate network (e.g., intranet) and one or more wireless access points.

Each of the servers 110 and 114 may represent a single computing device such as a computer server that includes a processor and a memory. The processor may execute computer instructions stored in memory. The servers 110 and 114 may be geographically collocated and/or the servers 110 and 114 may be disparately located. In some aspects, the servers 110 and 114 may collectively represent a computer server. In some aspects, the servers 110 and 114 may each be implemented using multiple distributed computing devices. The servers 110 and 114 are configured to communicate with client devices (e.g., the computing devices 102, 104, and 106) via the network 108.

The servers 110 and 114 may include data storages 112 and 116, respectively, for storing the usage data of the user or of the computing devices 102, 104, and 106. In some aspects, a UI mode) of an application implemented on the computing devices 102, 104, and 106 may be stored on the servers 110 and 114. For example, the UI model may include UI elements associated with the application, and the default importance measure of the UI elements. In one or more implementations, the computing device 102, the computing device 104, the computing device 106, the server 110, or the server 114 may be, or may include all or part of, the electronic system components that are discussed below with respect to FIG. 5.

Figure 1B:
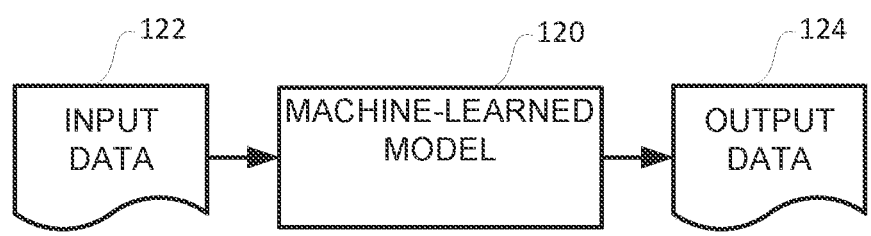
FIG. 1B illustrates a block diagram of depicts a block diagram of an example machine-learned model according to example aspects of the subject technology.

FIG. 1B depicts a block diagram of depicts a block diagram of an example machine-learned model according to example aspects of the subject technology. In some aspects, the subject technology may include or otherwise leverage one or more machine-learned models to adjust UI elements based on the usage data. The machine-learned model 120 may be trained to receive input data 122 (i.e., usage data) and, in response, provide output data 124 (i.e., sizes, locations, dimensions of UI elements). Thus, the machine-learned model 120 performs inference.

The machine-learned model may be one or more recurrent neural networks. Some of the nodes of a recurrent neural network may form a cycle Recurrent neural networks may be especially useful for processing input data that is sequential in nature. In particular, in some instances, a recurrent neural network may pass or retain information from a previous portion of the input data sequence to a subsequent portion of the input data sequence through the use of recurrent or directed cyclical node connections.

Sequential input data may include time-series data (e.g., pattern of clicks received at different times). A recurrent neural network may the usage data versus time to adjust UI elements to be included in the UI. As another example, sequential input data can include usage logs of an application and user interaction with UI elements.

Example recurrent neural networks may include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations.

In some aspects, the machine-learned model may be trained or otherwise configured to receive the input data and, in response, provide the output data. The input data can include different types, forms, or variations of input data. The input data may include the usage data including, for example, usage logs of the applications and user interactions with the UI elements of the UI associated with the applications.

In response to receipt of the input data, the machine-learned model may provide the output data. The output data can include different types, forms, or variations of output data. The output data can include data for adjusting UI elements. In some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above. In some implementations, the output data can influence downstream processes or decision making. As one example, in some implementations, the output data can be interpreted and/or acted upon by a rules-based regulator.

Thus, the subject technology provides systems and methods that include or otherwise leverage one or more machine-learned models adjust UI elements based on the usage data. Any of the different types or forms of input data described above can be combined with any of the different types or forms of machine-learned models described above to provide any of the different types or forms of output data described above.

The systems and methods of the subject technology may be implemented by or otherwise executed on one or more computing devices (i.e., computing devices 102, 104, and 106). Thus, in some implementations, the machine-learned model may be stored at and/or implemented locally by one or more computing devices (i.e., computing devices 102, 104, and 106). Output data obtained through local implementation of the machine-learned model at the computing device may be used to improve performance of the computing device (e.g., an application implemented by the computing device).

In other implementations, the machine-learned model may be stored at and/or implemented by a server (e.g., servers 110 and 114). Output data obtained through implementation of the machine-learned model at the server may be used to improve other server tasks or may be used by the computing devices (i.e., computing devices 102, 104, and 106) to improve services performed by or for the computing device. For example, the output data can improve other downstream processes performed by the server for a computing device (i.e., computing devices 102, 104, and 106). The server may be said to perform machine learning as a service.

Figure 2:
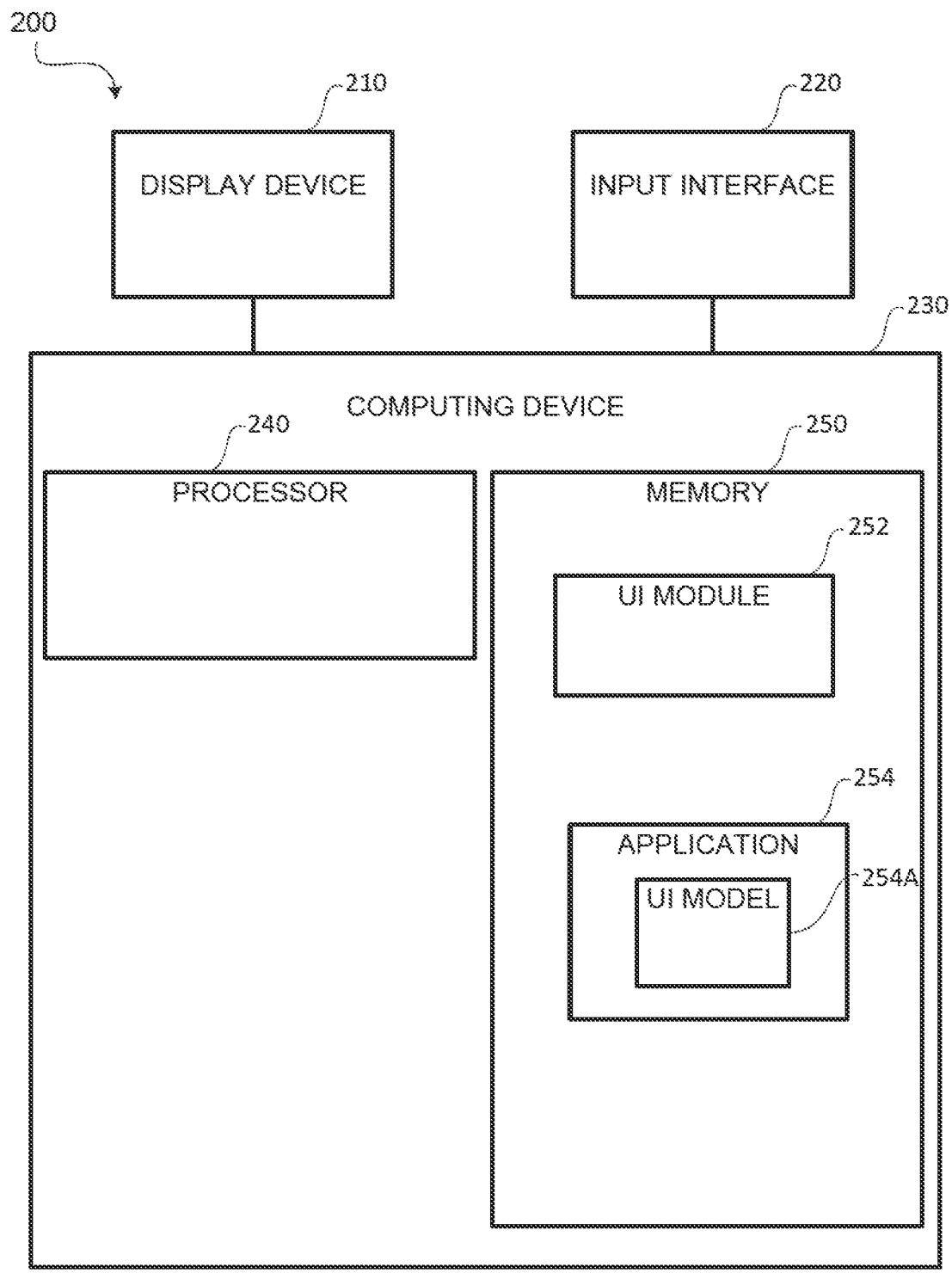
FIG. 2 illustrates an example data flow a system for optimizing a UI based on the current modality according to example aspects of the subject technology.

FIG. 2 illustrates an example system for optimizing a UI based on the current modality according to example aspects of the subject technology. The system 200 includes a display device 210, an input interface 220, and computing device 230. The display device 210 may display information provided by the operating system. The display device 210 may be a touchscreen. In some aspects, the display device 210 may be a convertible display in which the display device 210 may be a touchscreen when the computing device is in a tablet mode, and the display device 210 may be a conventional monitor when the computing device is in a laptop mode.

The input interface 220 may provide input signals from an input device (e.g., mouse, stylus, keyboard). For example, when a computing device is in a laptop mode, the computing device receives input signals from the input devices via the input interface 220. When the computing device is in a tablet mode, the display device 210 may act as a part of the input interface 220 from which the input signals may be received via the touchscreen.

The computing device 230 may include a processor 240 and a memory 250. The processor 240 may retrieve instructions and data to execute processes of the computing device 230. The number of processors is not limited to one as depicted in FIG. 2. However, the number of processors may be one or more. The memory 250 may include user interface (UI) module 252 and an application 254.

The UI module 252 may include instructions and data to generate a UI to be provided to the display device 210 based on a user interface (UI) model 254A associated with the application 254. The application 254 may be an application installed on the computing device 230. In some aspects, the application 254 may include system software, such as operating systems for computing devices. The application 254 may include the UI model 254A which may include a list of UI elements (i.e., menu options, icons, buttons), UI layouts, and rules for laying the UI elements, such as layout features and click target sizes of the UI elements, within the UI layouts for the application 254. The rules for laying UI elements may be specified by the designer of the UI, and may indicate UI elements to be included in the UI regardless of the current input modality or usage data. The rules for laying UI elements may indicate the minimum click target sizes of the UI elements specified by the designer of the UI.

Layout features may include the amount of space available to lay UI elements within a UI and available options to lay UI elements within the UI. Layout features may be determined based on the current input modality and the configuration (i.e., screen size, resolution) of the display device 210 of the computing device 230.

When a launch of the application 254 is detected, the UI module 252 may determine layout features of the UI associated with the application based on the current input modality of the computing device and the configurations of the display device 210 of the computing device. The layout features may be determined for the visible area of the UI provided on the display device 210. For example, the layout features may be the amount of space available to lay the UI elements within the UI. In some aspects, the layout features may indicate the number of UI elements included in the UI. In some aspects, the UI module 252 may receive a signal that the application is launched from the operating system 252 of the computing device 230. The UI module 252 may identify the current input modality of the computing device. The signal received from the operating system 230 may include data related to the current input modality of the computing device. The UI module 252 may retrieve UI information of the application 254 from the UI model based on the identified current input modality of the computing device. The UI module 252 may determine the layout features based on the identified current input modality and the retrieved UI information.

The UI module 252 may select a number of UI elements from the UI model 236 based on the determined layout features and respective importance scores of the UI elements. The UI module 252 may determine usage data of UI elements (i.e., menu options, icons, buttons, etc.) associated with the application 254. In some aspects, the UI module 252 may also include data of usage log of the application, measurement of importance specified by application UI designers, and/or usage patterns from other applications. The usage log of the application may include the time of the day the application was launched on the computing device, the number of hours the application was active, and/or the frequency of use of the application.

The UI module 252 may refer to the UI model 254A that may include measurement of importance for the UI elements specified, for example, by the designer of the application 254. The measurement of importance may indicate the importance of an UI element. An application UI designer may specify a UI element to be included in the UI regardless of the usage data of the UI element. The user may specify a UI element to be included in the UI via, for example, the preference setting. In some aspects, the user preference may override the measurement of importance specified by the application UI designer.

The UI module 252 may collect usage data from other applications having similar appearance, contents, and interactivity as the subject application and installed on the computing device. The collected usage data from the other applications may be included in the usage data of the subject application so that more data could be used to better optimize the UI. The collected usage data from the other applications may be used to update the UI model 254A.

The UI module 252 may determine importance scores for respective UI elements based on the determined usage data. In some aspects, the UI module 252 may determine importance scores based on the determined usage data and the specified measurement of importance of UI elements. UI elements having a number of clicks satisfying a threshold and/or included in the particular area of the layout of the application may have importance scores above a threshold score. For example, UI elements may be prioritized based on the importance scores of the UI elements. The UI module 252 may record the usage patterns of the UI elements of the application, and update the usage patterns of the UI elements based on the recording results. The importance scores for the UI elements are updated based on the updated usage pattern.

The UI module 252 may identify UI elements having an importance score satisfying a threshold score, and select a number of UI elements among the identified UI elements based on the determined click target sizes of the UI elements and the determined layout features of the UI. The UI module 252 may arrange the selected UI elements according to the UI layout stored in the UI model. The UI layout may indicate the locations of the UI elements relative to other UI elements on the UI of the application. For example, the UI layout may indicate that a UI element may be provided adjacent to another UI element. The UI module 252 may provide a UI with the selected UI elements arranged based on the UI layout for display.

The UI module 252 may identify a UI layout for the UI from the UI model. The UI designer of the application may specify a layout to be used. The UI module 252 may select a set of UI elements to be included in the UI. The UI module 252 may refer to the importance scores of the UI elements and select UI elements satisfying a threshold score. The UI model may include which UI elements to be included in the UI layout. A part of UI elements may be identified by the UI model, and the remainder of the UI elements may be selected based on the importance score of the UI elements. The UI module 252 may arrange the selected UI elements based on the UI layout, and provide the UI for display.

The UI module 252 may select a number of UI elements having importance scores satisfying a threshold score. The UI module 252 may arrange the selected UI elements based on the respective importance scores. A UI element having the highest importance score may be arranged in the top center of the UI. The remaining of the selected UI elements may be arranged within the UI relative to the UI element having the highest importance score. The UI module 252 may arranged the selected UI elements based on the importance scores of the UI elements within the UI, and provide the UI for display.

The UI module 252 may determine click target sizes of respective selected UI elements based on the current input modality of the computing device. Click target sizes of respective selected UI elements may be determined based on the current input modality of the computing device and the usage data. For example, an UI element having an importance score satisfying a threshold score based on the usage data may be considered having a higher measurement of importance to the user, and the UI element may be assigned a click target size satisfying a threshold click target size. The UI module 252 may provide the UI the arranged UI elements for display.

Figure 3A:
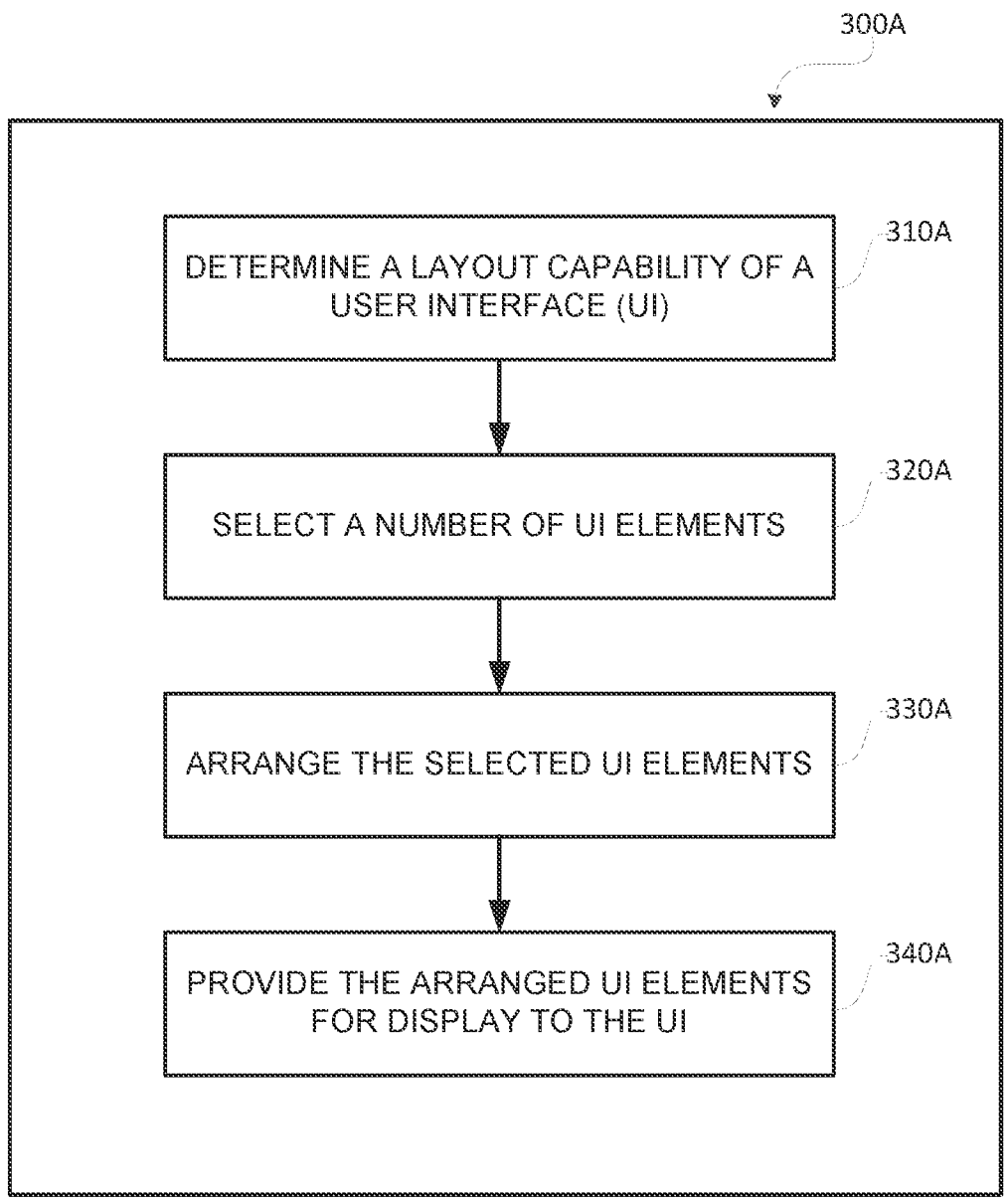
FIG. 3A shows a flowchart illustrating example processes for adjusting a UI based on the current modality according to example aspects of the subject technology.

FIG. 3A shows a flowchart illustrating an example process 300A for automatically adjusting a UI based on the current input modality according to example aspects of the subject technology. For explanatory purposes, the various blocks of example process 300A are described herein with reference to the components and/or processes described herein. The one or more of the blocks of process 300A may be implemented, for example, by one or more components or processors of server 110 and/or server 114 of FIG. 1. In some implementations, one or more of the blocks may be implemented apart from other blocks, and by one or more different processors or controllers. Further, for explanatory purposes, the blocks of example process 300A are described as occurring in serial, or linearly. However, multiple blocks of example process 300A may occur in parallel. In addition, the blocks of example process 300A need not be performed in the order shown and/or one or more of the blocks of example process 300A need not be performed.

At block 310A, layout features of a UI are determined based on a UI model and an input modality of the computing device. The UI module may determine the layout features of the UI in response to detecting a change in the input modality based on a change in the device configuration of the computing device while an application is active. In some aspects, the UI module may determine the layout features of the UI in response to detecting the launch of an application.

The UI module may determine the current input modality of the computing device. In some aspects, the current input modality may be determined in response to detecting the change in the input modality or detecting the launch of the application. In some other aspects, the UI module may check the current input modality of the computing device.

For example, the UI module may determine that the current input modality of the computing device is touchscreen-based input that is associated with a tablet mode. The UI module detects the computing device in a tablet mode, which uses a touchscreen-based input, and determines that the current input modality of the computing device as the touchscreen-based input. The UI module may refer to a UI model associated with the launched application, and determine layout features of the UI of the launched application associated with the tablet mode. The layout features may be the amount of space available to lay UI elements within a UI. The layout features may be determined for the visible area of the UI on the display device. In some aspects, the layout features of the UI of the launched application may differ based on the laptop mode or the tablet mode. The layout features of the UI of the laptop mode may be larger than that of the tablet mode.

At block 320A, a number of UI elements to be displayed on the UI are selected from the UI model based on the layout features and respective importance scores of the UI elements. The UI module may determine respective importance scores of the UI elements based on usage data of the UI elements. The space (e.g., click target size) required to display respective UI elements on the UI is determined based on the importance scores of the UI elements. For example, when an UI element is selected more often than the other UI elements in the UI or is included in the area of the UI that the user appears to be interested in based on the attention span, the UI element may be given a high importance score indicating a high importance measure. Therefore, the UI element may be given more space than other UI elements in the UI resulting in the UI element appearing larger than the other UI elements in the UI. Based on the determined importance scores and the rules in the UI model, the UI module may select UI elements to be included in the UI provided for display.

At block 330A, the selected UI elements are arranged according to the UI model. For example, the UI module may determine the arrangement of the selected UI elements based on respective importance scores and click target sizes. The UI module may arrange the remaining UI elements on the list of elements to be included in the UI with a click target size above a minimum threshold click target size. In some aspects, UI elements having importance scores below the threshold score may be hidden (i.e., not provided to the UI for display). When the input modality of the computing device is changed from the touch screen-based input to the mouse-based input, a layout of the UI in which the hidden UI elements may be provided to the UI for display may be performed.

At block 340A, the selected UI elements in the determined arrangement are provided for display to the UI.

Figure 3B:
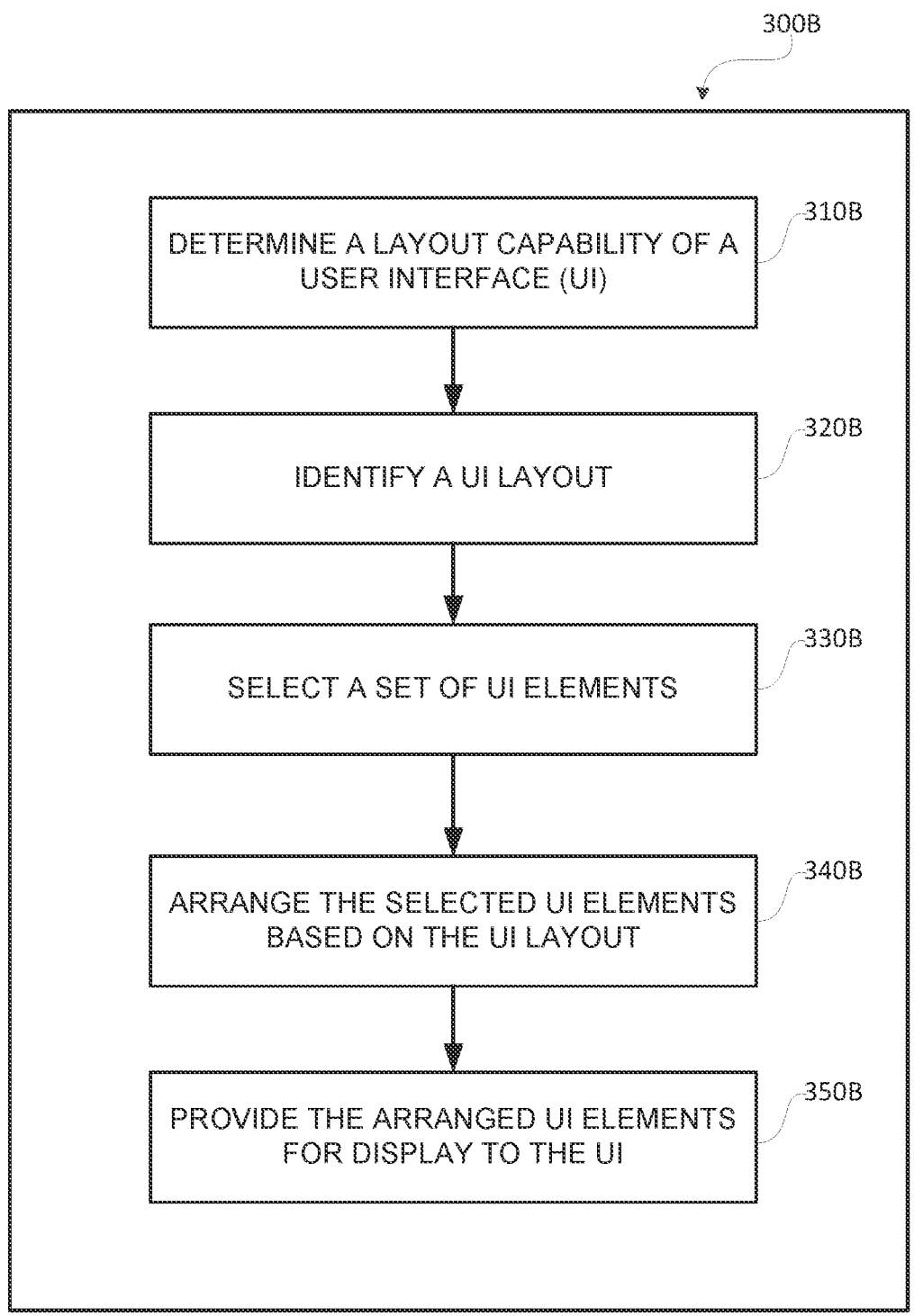
FIG. 3B shows a flowchart illustrating example processes for adjusting a UI based on the current modality according to example aspects of the subject technology.

FIG. 3B shows a flowchart illustrating an example process 300B for automatically adjusting a UI based on the current input modality according to example aspects of the subject technology. For explanatory purposes, the various blocks of example process 300B are described herein with reference to the components and/or processes described herein. The one or more of the blocks of process 300B may be implemented, for example, by one or more components or processors of server 110 and/or server 114 of FIG. 1. In some implementations, one or more of the blocks may be implemented apart from other blocks, and by one or more different processors or controllers. Further, for explanatory purposes, the blocks of example process 300B are described as occurring in serial, or linearly. However, multiple blocks of example process 300B may occur in parallel. In addition, the blocks of example process 300B need not be performed in the order shown and/or one or more of the blocks of example process 300B need not be performed.

At block 310B, layout features of a UI are determined based on a UI model and an input modality of the computing device. The UI module may determine that the current input modality of the computing device is touchscreen-based input that is associated with a tablet mode.

At block 320B, a UI layout is identified based on a UI model. The UI module may refer to the UI model and identify a UI layout to be used. The UI layout may be identified based on the current input modality, or based on the UI designer of the application specifying in the UI model.

At block 330B, a set of UI elements to be included in the UI may be selected based on the UI layout. Some of the UI elements may be specified to be included in the UI with the identified UI layout as indicated by the UI model. In some instances, the UI elements may be selected based on the respective importance scores of the UI elements. UI elements having importance scores satisfying a threshold score may be selected to be included in the UI.

At block 340B, the set of UI elements may be arranged within the UI based on the identified UI layout. The locations of the UI elements relative to each other may be specified by the UI layout. In some aspects, the click target sizes of the UI elements may be considered in arranging the set of UI elements within the UI. The relative locations of the UI elements may be specified by the UI layout, and depending on the click target sizes of the UI elements, the locations of the UI elements may be set within the UI.

At block 350B, the UI elements arranged within the UI based on the UI layout may be provided for display.

Figure 3C:
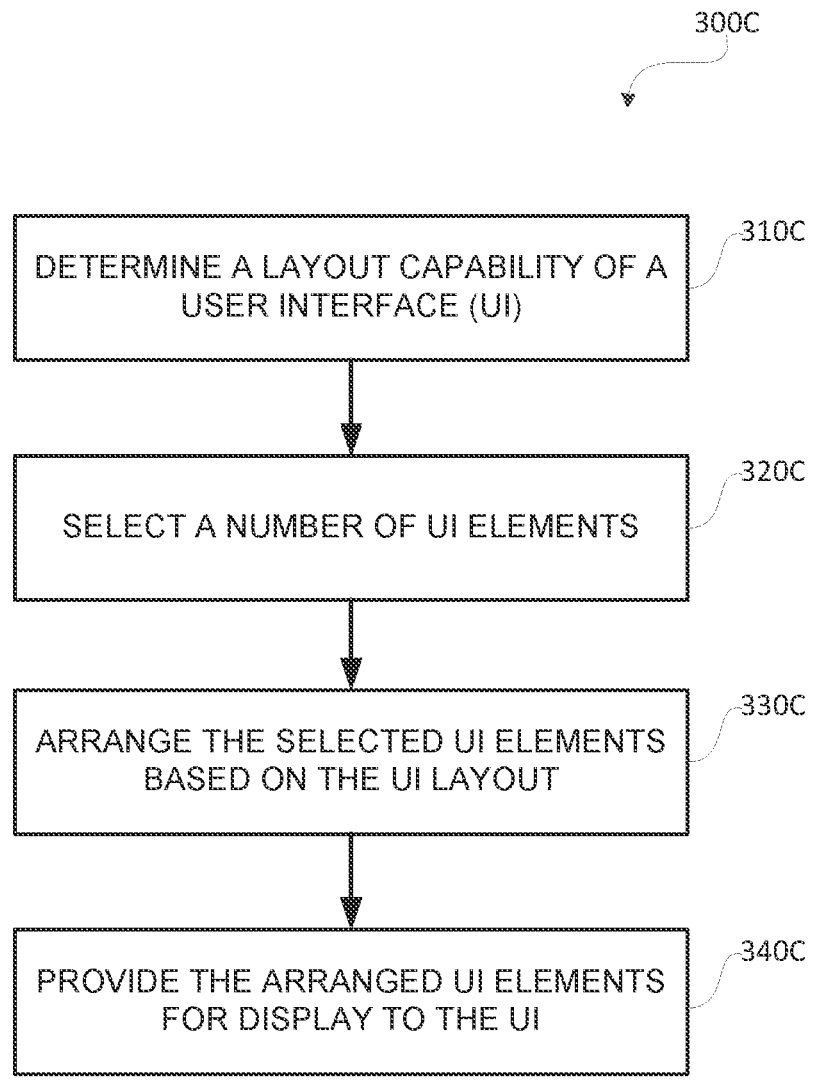
FIG. 3C shows a flowchart illustrating example processes for adjusting a UI based on the current modality according to example aspects of the subject technology.

FIG. 3C shows a flowchart illustrating an example process 300C for automatically adjusting a UI based on the current input modality according to example aspects of the subject technology. For explanatory purposes, the various blocks of example process 300C are described herein with reference to the components and/or processes described herein. The one or more of the blocks of process 300C may be implemented, for example, by one or more components or processors of server 110 and/or server 114 of FIG. 1. In some implementations, one or more of the blocks may be implemented apart from other blocks, and by one or more different processors or controllers. Further, for explanatory purposes, the blocks of example process 300CB are described as occurring in serial, or linearly. However, multiple blocks of example process 300C may occur in parallel. In addition, the blocks of example process 300C need not be performed in the order shown and/or one or more of the blocks of example process 300B need not be performed.

At block 310C, layout features of a UI are determined based on a UI model and an input modality of the computing device. The UI module may determine that the current input modality of the computing device is touchscreen-based input that is associated with a tablet mode.

At block 320C, a number of UI elements may be selected based on the respective importance scores. The UI elements may be selected based on the respective importance scores of the UI elements satisfying a threshold score.

At block 330C, the set of UI elements may be arranged within the UI based on a UI layout stored in the UI model. The locations of the UI elements may be determined based on the importance score of the UI elements and the UI layout. In some aspects, the click target sizes of the UI elements may be also considered in arranging the set of UI elements within the UI. At block 340C, the UI elements arranged within the UI may be provided for display.

Figure 4:
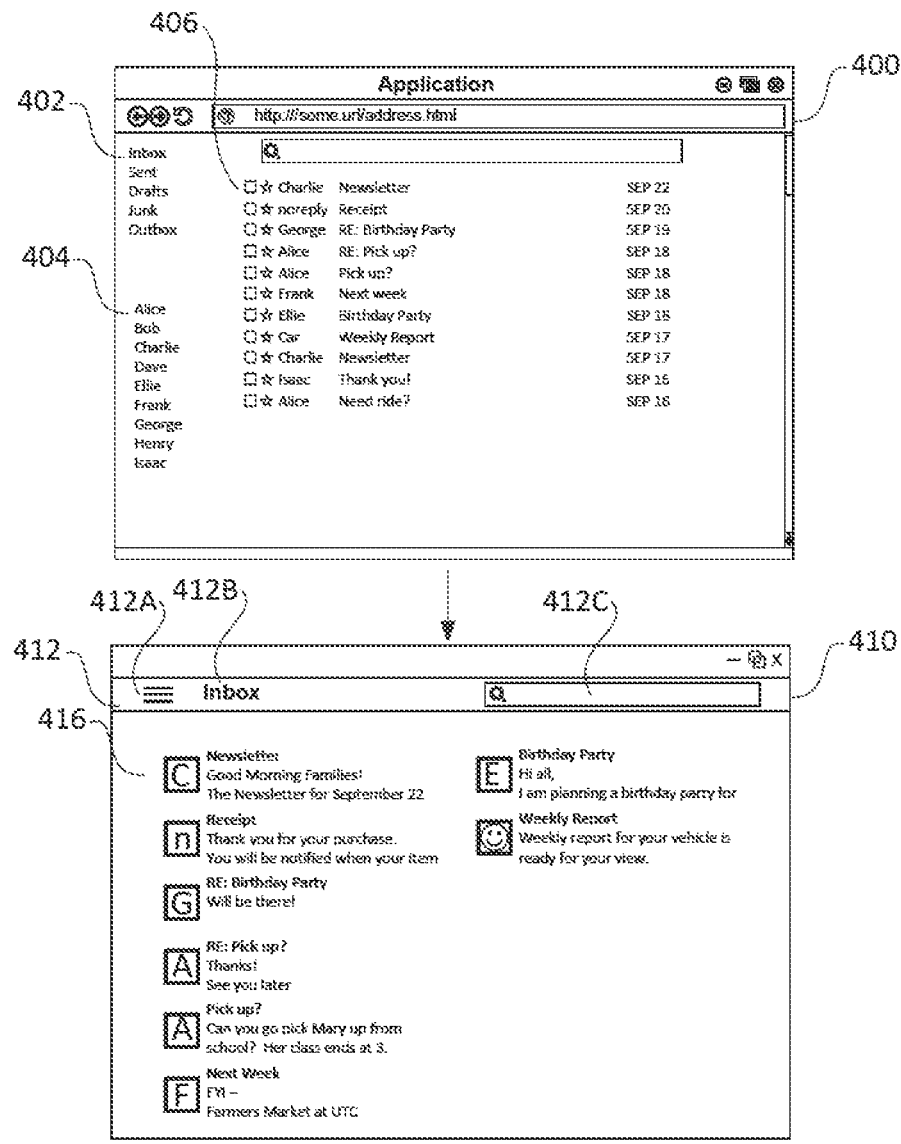
FIG. 4 illustrates example user interfaces adjusted for different input modalities according to example aspects of the subject technology.

In some aspects, the UI may include a scrollable container view (e.g., a list of messages in email inbox) as illustrated in FIG. 4. FIG. 4 illustrates example user interfaces adjusted for different input modalities according to example aspects of the subject technology.

UI 400 is associated with an application (i.e., email application) and is generated based on a mouse-based input modality. For example, UI module detects a computing device in a laptop mode, which uses a mouse-based input, and determines that the current input modality of the computing device as the mouse-based input. The UI module determines layout features of a UI (i.e., UI 400) associated with the mouse-based input modality based on a UI model associated with the application. The UI module determines a number of UI elements to be included in the UI 400 based on the layout features and respective importance scores of the UI elements and selects UI elements to be included in the UI 400.

As shown in the UI 400, the UI 400 may include UI elements 402, 404, 406, and 408. The UI elements 402 may be a group of menu options including, for example, five email folders (i.e., Inbox, Sent, Drafts, Junk, Outbox). The UI elements 404 may be a group of menu options for the list of contacts (i.e., Alice, Bob, Charlie, Dave, Ellie, Frank, George, Henry, Isaac). The UI elements 406 may be a group of menu options for list of messages of Inbox (i.e., 11 messages) which may be a scroll view. The UI element 408 may be a search bar for searching items (e.g., email messages, contacts) in the email application.

The UI module may refer to the UI model of the application and determine that the UI elements 406 (i.e., list of messages in Inbox) should always be included in the UI. The application UI designer of the email application may specify in the UI model that the UI elements 406 should be included regardless of the usage data. The UI module may determine that the UI elements 402 and 404 may be included in the UI based on remaining available space according to the layout features. The UI module may determine that UI elements included in the UI elements 402 and 404 may be selected more often than other UI elements in the application, and the UI elements 402 and 404 may have importance scores that satisfy a threshold score based on the usage data of the UI elements. The UI module may select the UI element 408 to be included in the UI. The user may specify the UI element 408 to be included in the UI. Based on the preferences set by the user, the UI module may determine to include the UI element 408 in the UI.

The UI module may arrange the selected UI elements 402, 404, 406, and 408 based on the UI model of the application and usage data. The UI module may arrange the UI elements 402, 404, 406, and 408 based on the UI layout specified by the UI designer of the application in the UI model. The UI module may determine the click target sizes of the UI elements based on the respective importance scores determined based on the usage data. In some aspects, the UI module may determine the appearance sizes of the UI elements based on the click target sizes of the UI elements. For example, the textual items in the list of messages in the UI elements 406 are provided for display in a single line view.

UI 410 is associated with the application (i.e., email application) and is generated for a touchscreen-based input modality. UI module detects a computing device in a tablet mode, which uses a touchscreen-based input, and determines that the current input modality of the computing device as the touchscreen-based input. The UI module determines layout features of a UI (i.e., UI 410) associated with the touchscreen-based input modality based on the UI model associated with the application. The UI module determines a number of UI elements to be included in the UI 410 based on the layout features and respective importance scores of the UI elements and selects UI elements to be included in the UI 410.

As shown in UI 410, the UI 410 may include UI elements 412A, 412B, 416, and 418. In some aspects, the UI elements 412A and 412B may correspond to UI elements 402 and 404 in the UI 400. The UI module may determine that the email folders (i.e., UI elements 402), the list of contacts (i.e., UI elements 404), the email messages (i.e., UI elements, 406), and the search bar (i.e., UI element 408) should be included in the UI 410 (i.e., touchscreen-based input modality) based on the UI model of the email application.

The UI module may arrange the UI elements 412A, 412B, 416, and 418 based on the UI model of the application and usage data. The UI module may determine that click target sizes of the UI elements in the UI 410 for touchscreen based input modality may be larger than those of the UI elements in the UI 400 for mouse-based input modality. Accordingly, the UI module may select a predetermined number of UI elements (e.g., one, three) from a group of UI elements, and provide for display the predetermined number of UI elements and hide the other UI elements.

In some aspects, the UI module may determine that the email folders are more frequently accessed than the list of contacts, and that "Inbox" may be most frequently accessed out of the email folders based on the usage data. Accordingly, the UI module may compress and hide some folder of the email folders in the UI elements 402 and the list of contacts in the UI elements 404 under a UI element 412A.

The user may access the hidden UI elements by selecting the UI element 412A. When the user clicks on the UI element 412A, a list including the hidden UI elements may be displayed in an expanded view, and the user may be able to access the hidden UI elements. The UI module may provide "Inbox" that is most frequently accessed out of the list of email folders based on the usage data as the UI element 412B in the UI 410.

The UI module may determine that the list of email messages is the most frequently accessed UI elements within the email application based on the usage data. The UI module may set the click target sizes for the UI elements 416 in the UI 410 to be larger than the click target sizes set for the UI elements 406 in the UI 400. The UI module may determine that the email messages (i.e., UI elements 406 in the UI 400, UI elements 416 in the UI 410) that were provided for display as a single line view in UI 400 may be provided for display as a multiple line view that includes a part of the content of the email messages based on the user preferences. In some aspects, the number of items included in the UI elements 406 in the UI 400 and the number of items included in the UI elements 416 in the UI 410 may differ. The UI elements 416 may include fewer items (i.e., messages) than the UI elements 406 based on the click target sizes set for items in the UI elements 416 being larger than the click target set for items in the UI elements 406. Accordingly, each item in the UI elements 416 may occupy larger space than each item in the UI elements 406, and thus, there may not be enough space to accommodate all items included in the UI elements 406 into the UI elements 416. In some aspects, the appearance sizes of UI elements may correlate with the click target sizes. The appearance sizes of the UI elements 416 may be set larger than the UI elements 406 since the click target sizes of the UI elements 416 are set larger than the UI elements 406.

The UI module may determine that the UI element 418 (i.e., search bar), which corresponds with the UI element 408 in the UI 400, should be included in the UI 410. For example, the usage indicates that the search bar is less frequently used when the computing device is operating in a touchscreen-based input modality than when the computing device is operating in a mouse-based input modality. The UI module may reduce the click target size and the appearance size of the UI element 418 in the UI 410.

The UI module may arrange the selected groups of UI elements 412 and 416 based on the UI model of the application. For example, the UI module may arrange the groups of UI elements 412 and 416 based on the UI layout specified by the designer of the application in the UI model. In some aspects, the UI module may determine the click target sizes of the UI elements in the groups of UI elements based on the respective importance scores determined based on the usage data. In some other aspects, the UI module may determine the appearance sizes of the UI elements.

The application may provide a UI model for either of the input modalities (i.e., mouse-based input modality, touchscreen-based input modality) of the computing device. For example, in case only the UI model for a laptop mode is available to the UI module, the arrangements of the UI elements to be provided to the UI for display may be converted to the arrangements of the UI elements suited for a tablet mode based on the constant recording of the usage pattern of the UI elements by the UI module.

The UI module may associate the usage patients and arrangements of the UI elements to respective user accounts. In such case, the usage patterns and arrangements of the UI elements may be carried out on the associated user account regardless of the computing device being used.

The UI module may update the arrangements of the UI element in response to updating the usage patterns of the UI elements. For example, the click target sizes may be adjusted according to the updated usage patterns within one session of the application.

Figure 5:
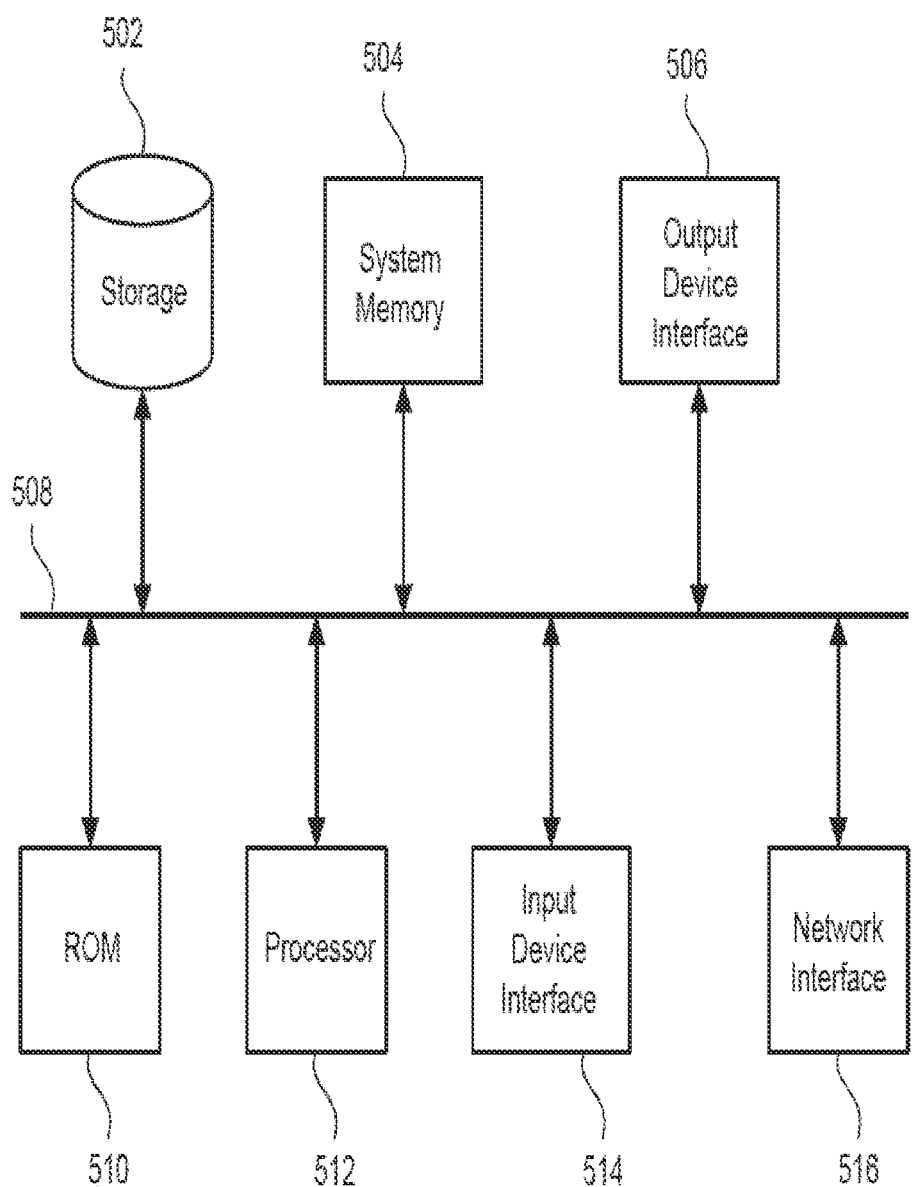
FIG. 5 conceptually illustrates an example electronic system with which some implementations of the subject technology can be implemented.

FIG. 5 conceptually illustrates an example electronic system 500 with which some implementations of the subject technology can be implemented. Electronic system 500 can be a computer, phone, personal digital assistant (PDA), or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 308 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk, or flash memory) as permanent storage device 502.

Other implementations use a removable storage device (for example, a floppy disk, flash drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject disclosure are stored in system memory 504, permanent storage device 502, or ROM 510. For example, the various memory units include instructions for displaying graphical elements and identifiers associated with respective applications, receiving a predetermined user input to display visual representations of shortcuts associated with respective applications, and displaying the visual representations of shortcuts. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 616. In this manner, the computer can be a part of a network of computers (for example, a LAN, a WAN, or an Intranet, or a network of networks, for example, the internet). Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact, discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and flies including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" "or" of to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

To the extent that the systems discussed herein collect usage data associated with users, or may make use of the usage data, the users are provided with opportunities to control whether programs or features collect usage data (e.g., a user's preferences), and to control the UI associated with applications based on the collected usage data. The users may also be provided with options to turn on or turn off certain features or functions provided by the systems. In some aspects, the users may elect to disable features and functions (e.g., control the UI associated with applications based on the collected usage data) offered by the systems discussed herein. In addition, users may stipulate that certain data be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user has control over whether and how user information is collected, stored, and used by the disclosed systems.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. Furthermore, to the extent that the term "include", "have", or the like is used in the description or the claims, such term is intended to be inclusive in a manner similar to the term "comprise" as "comprise" is interpreted when employed as a transitional word in a claim.

The invention claimed is:

1. A method, comprising:
   identifying, with one or more processors, an input modality as one or more of a touchscreen-based input modality and a stylus-based input modality;
   determining, with the one or more processors, layout features of a user interface of an application on a computing device based on the input modality of the computing device;
   obtaining, from a user's interaction with the user interface, usage data including a pattern of clicks, wherein the pattern of clicks comprises respective touch sizes of the clicks;
   determining, from the input modality and the usage data of the application, respective importance scores of user interface elements;

determining, from the respective importance scores, respective locations and sizes of each of the user interface elements as an arrangement of the user interface elements;

determining, with the one or more processors, respective click target sizes of the user interface elements;

selecting, with the one or more processors and based on the click target sizes of the user interface elements, the layout features, and the respective importance scores of the user interface elements, a set of user interface elements from the user interface elements; and providing, for display, the set of user interface elements according to the arrangement.

2. The method of claim 1, further comprising determining the respective importance scores from one or more of: rules provided by the user, rules provided by a designer of the application, usage data of the application, and usage data of similar applications.

3. The method of claim 1, further comprising:
identifying the usage data associated with the user interface elements;
one or more of rearranging the set of user interface elements based on the usage data and adjusting the respective click target sizes of the set of user interface elements based on the usage data to obtain rearranged user interface elements; and
providing the rearranged user interface elements for display to the user interface.

4. The method of claim 1, wherein determining respective locations and sizes of the user interface elements as the arrangement of the user interface elements comprises applying the usage data to a machine-learned model.

5. The method of claim 1, wherein the usage data further comprises a time log of the user's interaction with the application.

6. The method of claim 1, wherein the user's interaction with the application further comprises an attention span.

7. The method of claim 1, wherein the pattern of clicks further comprises one or more of a type of clicking device, a type of selecting mechanism, a number of clicks, a number of failed clicks, and a number of useless clicks.

8. A computing system, comprising:
one or more processors; and
a non-transitory machine-readable medium comprising instructions stored therein, which, when executed by the one or more processors, cause the one or more processors to perform operations comprising:
identifying an input modality as one or more of a touchscreen-based input modality and a stylus-based input modality;
determining layout features of a user interface of an application on a computing device based on the input modality of the computing device;
obtaining, from a user's interaction with the user interface, usage data including a pattern of clicks, wherein the pattern of clicks comprises respective touch sizes of the clicks;
determining, from the input modality and the usage data of the application, respective importance scores of the user interface elements;
determining, from the layout features and the respective importance scores, respective locations and sizes of each of the user interface elements as an arrangement of the user interface elements;
determine respective click target sizes of the user interface elements;
select, based on the click target sizes of the user interface elements, the layout features, and the respective importance scores of the user interface elements, a set of user interface elements from the user interface elements; and
providing, for display, the set of user interface elements according to the arrangement.

9. The computing system of claim 8, wherein the respective importance scores are further based on one or more of: rules provided by the user, rules provided by a designer of the application, usage data of the application, and usage data of similar applications.

10. The computing system of claim 8, wherein the operations further comprise:
identifying the usage data associated with the user interface elements;
one or more of rearranging the set of user interface elements based on the usage data and adjusting the respective click target sizes of the set of user interface elements based on the usage data to obtain rearranged user interface elements; and
providing the rearranged user interface elements for display to the user interface.

11. The computing system of claim 8, wherein determining respective locations and sizes of the user interface elements as the arrangement of the user interface elements comprises applying the usage data to a machine-learned model.

12. The computing system of claim 8, wherein the usage data further comprises a time log of the user's interaction with the application.

13. The computing system of claim 8, wherein the user's interaction with the application further comprises an attention span.

14. The computing system of claim 8, wherein the pattern of clicks further comprises one or more of a type of clicking device, a type of selecting mechanism, a number of clicks, a number of failed clicks, and a number of useless clicks.

15. A non-transitory computer-readable medium comprising instructions stored therein, which, when executed by a processor, cause the computer to perform operations comprising:
identifying an input modality as one or more of a touchscreen-based input modality and a stylus-based input modality;
determining layout features of a user interface of an application of a computing device based on the input modality of the computing device;
obtaining, from a user's interaction with the user interface, usage data including a pattern of clicks, wherein the pattern of clicks comprises respective touch sizes of the clicks;
determining, from the input modality and the usage data of the application, respective importance scores of the user interface elements;
determining, from the respective importance scores, respective locations and sizes of each of the user interface elements as an arrangement of the user interface elements;
determine respective click target sizes of the user interface elements;
select, based on the click target sizes of the user interface elements, the layout features, and the respective importance scores of the user interface elements, a set of user interface elements from the user interface elements; and providing, for display, the set of user interface elements according to the arrangement.

16. The non-transitory computer-readable medium of claim 15, wherein the respective importance scores are further based on one or more of: rules provided by the user, rules provided by a designer of the application, usage data of the application, and usage data of similar applications.

17. The non-transitory computer-readable medium of claim 15, the operations further comprising:
identifying the usage data associated with the user interface elements;
one or more of rearranging the set of user interface elements based on the usage data and adjusting the respective click target sizes of the set of user interface elements based on the usage data to obtain rearranged user interface elements; and
providing the rearranged user interface elements for display to the user interface.

18. The non-transitory computer-readable medium of claim 15, wherein determining respective locations and sizes of the user interface elements as the arrangement of the user interface elements comprises applying the usage data to a machine-learned model.

19. The non-transitory computer-readable medium of claim 15, wherein the usage data further comprises a time log of the user's interaction with the application.

20. The non-transitory computer-readable medium of claim 15, wherein the user's interaction with the application further comprises an attention span.

* * * * *